Aug. 8, 1950     I. E. MUSKAT     2,517,698
METHOD OF POLYMERIZING FIBER REINFORCED
RESINOUS MATERIALS
Filed March 5, 1945
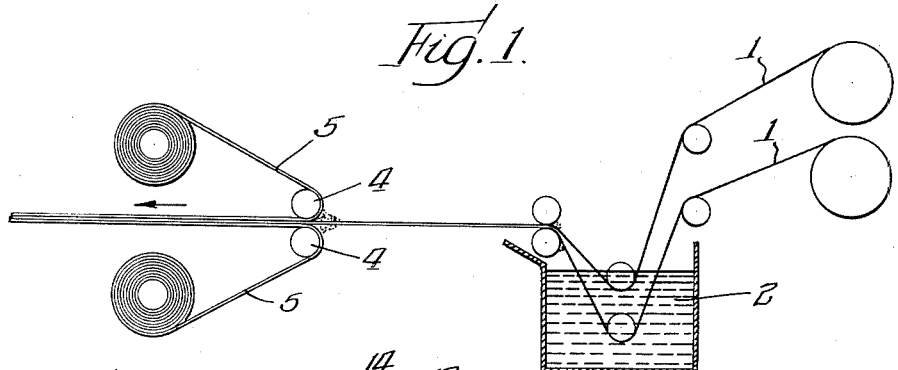
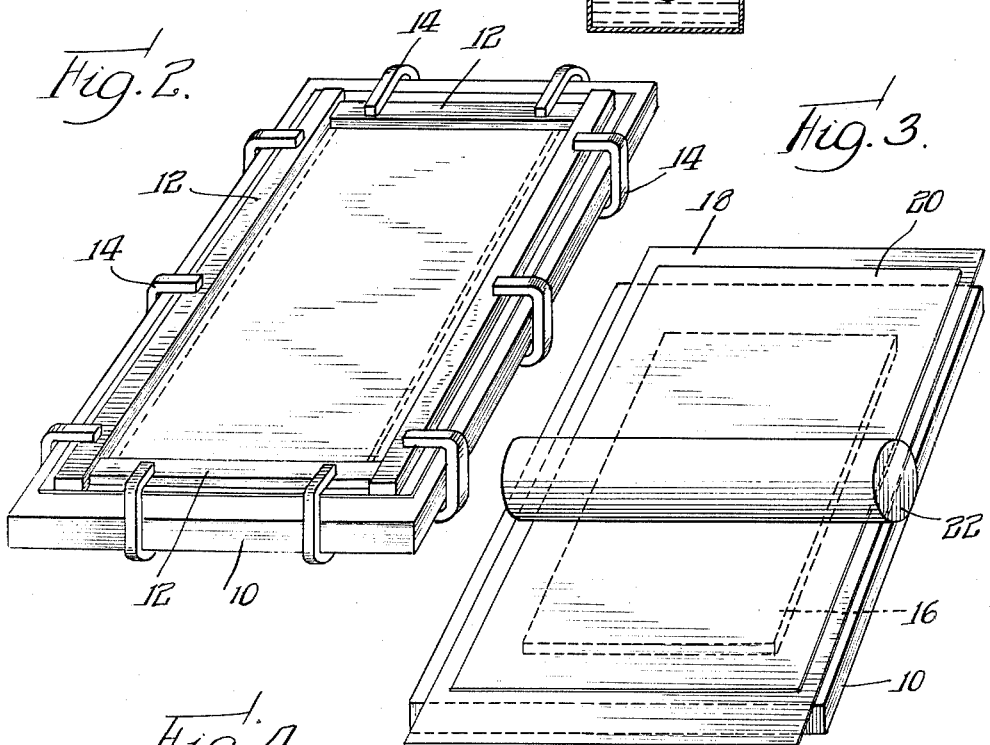
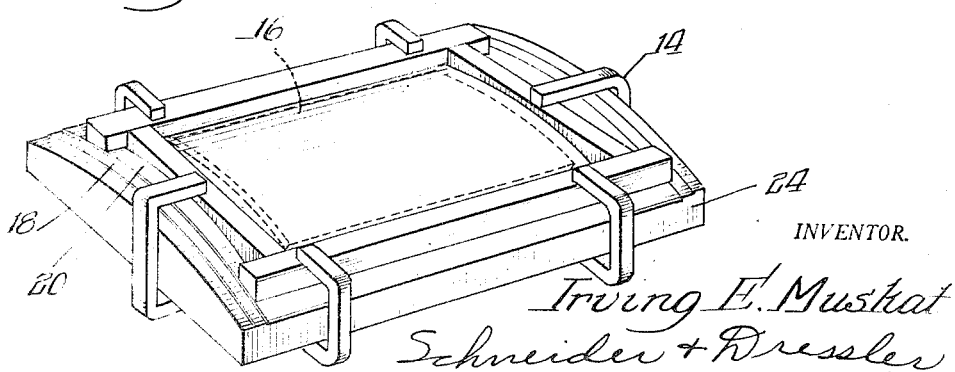
INVENTOR.
Irving E. Muskat
Schneider & Dressler
attys.

Patented Aug. 8, 1950

2,517,698

UNITED STATES PATENT OFFICE 2,517,698

METHOD OF POLYMERIZING FIBER REINFORCED RESINOUS MATERIALS

Irving E. Muskat, Plainfield, N. J., assignor to Marco Chemicals, Inc., a corporation of New Jersey Application March 5, 1945, Serial No. 581,165

13 Claims. (Cl. 117—65)

This invention relates to a method of preparing fiber-reinforced resinous parts.

It is known to form laminated fabric sheets or other elements by impregnating a plurality of assembled sheets with resin and curing the assemblage in a press under high pressure, in the order of about 1000 to 2000 pounds per square inch and even higher. Such processes are often objectionable because of the expensive equipment required and further because products of limited size and shape only can be produced due to the high pressure which must be developed.

More recently, certain laminated resinous parts have been formed without substantial pressure by inserting a stack of impregnated sheets between a pair of glass sheets and curing the assemblage. In such a case the products obtained often are irregularly impregnated and contain insufficient or excess resin and exhibit unsightly blemishes, drain marks, blisters and similar defects which weaken the laminate or otherwise impair its use. Furthermore the breakage of glass in the process is often so serious as to make the process unfeasible from a commercial standpoint.

Use of metal plates in lieu of the glass in such a process has not proven satisfactory due to the greater weight of such parts and the greater tendency to produce defective products, since the metal plates are opaque and the formation of defects cannot be readily detected.

The problem is particularly acute when fabric sheets or parts of a curved or similarly shaped cross section are produced by this method, since the mating molds used must fit accurately and often slight inaccuracies in the shape of the molds will cause production of products which are defective due to drainage, wrinkles, blister formation, etc.

In order to avoid the expense of accurately machined pairs of mating molds, shaped resin laminates have been prepared by laying an impregnated fibrous sheet or stack of sheets upon a mold of desired shape or contour, enclosing the mold and the fibrous sheets in a rubber bag and evacuating the bag. This process requires the use of a specially prepared bag of substantial weight in order to withstand the differential pressure established by the evacuation and, moreover, the bags can be used for a limited number of times only before breaking down under the curing temperatures. Furthermore, the bags generally must be constructed to a special shape for each individual part. Consequently the process is objectionably expensive. In addition, the production of articles which are uniformly impregnated with a controlled amount of resin is difficult.

In accordance with the present invention many of these difficulties may be avoided or substantially minimized and a well-bonded product containing a controlled amount of resin obtained. In carrying out the process of my invention, a sheet or plurality of superimposed sheets may be impregnated with a liquid polymerizable material and placed in a nonporous envelope of light, flexible construction, at least one side or wall of which is made of a flexible, transparent, nonporous material such as cellophane. The envelope may be formed by folding a sheet of cellophane about the impregnated fibrous base, thus forming an envelope which is open on three sides, or by sandwiching an impregnated fibrous base between a pair of cellophane sheets. The open sides of the envelope are clamped or otherwise brought together to substantially seal the impregnated base within the envelope and thereby minimize drainage of the polymerizable liquid from the base and entry of air into the base. The fibrous base so enclosed is then polymerized as hereinafter described.

In performance of this process it may at times be observed that the flexible wall is not applied in a completely wrinkle-free condition. This often causes formation of unsightly spots in the laminate adjacent the wrinkles. Furthermore, wrinkles in the flexible wall and consequent defects in the laminate may be formed during polymerization in some cases. I have discovered that these difficulties may be avoided and an improved product obtained when the flexible wall is subjected to tension during the polymerization. This tension should be sufficient to substantially eliminate the wrinkles in the flexible wall and to effectively reduce any tendency to form additional wrinkles. The process may be advantageously performed by use of a flexible wall made of a material such as cellophane which is capable of shrinking upon heating. In this case it is usually desirable to clamp the cellophane or similar sheet in a manner such as to restrict movement of opposite edges of the sheet toward each other. Thereupon the cellophane sheet tends to shrink upon heating the resin-impregnated sheet and to tighten or at least flatten out over the surface of the impregnated base, often establishing tension in the cover sheet and thereby imparting some additional compacting or flattening pressure upon the impregnated base during curing.

In general it is found desirable to impregnate the fibrous base with an excess of polymerizable liquid and to squeeze out the excess of resin after application of the envelope or concurrently therewith. This squeezing action forces the excess polymerizable liquid out from under the envelope and sweeps entrapped air in a direction laterally with respect to the flexible wall and to a region adjacent the edges of the fibrous base. In accordance with a particularly effective method of accomplishing this result, the squeezing or compacting may be effected by rolling or application of other squeezing pressure which moves from an interior portion of the impregnated base toward an edge thereof, whereby the excess polymerizable liquid and entrapped air is positively forced to the edge of the fabric. By means of this squeezing pressure the flexible sheet or envelope is forced into intimate contact with the fibrous base and by control of the degree of pressure applied it is possible to control the resin content of the ultimate product. The sheet thus compacted is in close contact with the flexible cover, the cover being at least partially held in place by atmospheric pressure and partially by the adhesion of the impregnated base to the cover. Consequently, after the removal of the air and excess polymerizable liquid the envelope is effectively held against the impregnated fabric and the compacting and squeezing pressure may be released completely or reduced substantially to a pressure sufficient to hold the layers of the laminate in place. The polymerizable liquid forced to the edges of the fibrous base effectively seals the assemblage against reentry of air into a central portion of the fibrous base as described in my copending application, Serial No. 526,776, filed March 16, 1944. The process is particularly effective when a polymerizable liquid which is comparatively viscous and adhesive is used since the liquid more effectively seals at the edges, preventing or minimizing subsequent inclusion of air in the fibrous base during curing.

The assemblage is clamped to restrict movement of the opposite edges of the flexible sheet during polymerization and is then polymerized while the seal is maintained at least until a solid, or semi-solid polymer in an immobile state has been secured. In this state the polymer is in an intermediate state of cure and the laminate is flexible. The clamped assemblage may be further polymerized to complete the cure of the polymer, at which time it is infusible and insoluble and the laminate is relatively rigid and strong, or the clamps may be removed and the assemblage draped over a mold or other form to impart a desired shape to it and then cured to completion, as described in my copending application, Serial No. 580,474, filed March 1, 1945. In either case the polymerization is preferably effected without pressure or without a substantial pressure on the impregnated base; however, it can also be effected at other low pressures up to about 300 pounds per square inch. It may be effected with higher pressures, but such high pressures are not necessary and, in many instances, are objectionable.

The invention may be more fully understood by reference to the accompanying drawing in which:

Fig. 1 is a diagrammatic view of apparatus which may be used for preparing an impregnated sheet in accordance with the present invention;

Fig. 2 is a perspective view illustrating apparatus for clamping the edges of a segment of a sheet formed as in Fig. 1, to cure the sheet in accordance with the method of my invention;

Fig. 3 illustrates a modified form of apparatus for preparing an impregnated sheet; and Fig. 4 illustrates apparatus for producing a curved, resin-bonded fibrous base in accordance with my invention.

As illustrated in Fig. 1, a fibrous base in the form of a continuous web or a plurality of continuous sheets 1 may be impregnated by passing the sheet or sheets through a tank 2 containing a polymerizable liquid and, following impregnation, the sheets are superposed. The laminate so formed may be passed between rollers 4 which simultaneously squeeze out excess polymerizable liquid and entrapped air and apply cover sheets of cellophane or other impermeable, nonadherent, flexible material 5 to the laminate, sealing the cover sheets to the surface of the laminate.

As indicated in the drawing, the squeezing action of the rolls 4 causes an accumulation of a body of polymerizable liquid in front of and in contact with the roll, thus forming a seal in front of the roll which prevents or minimizes air entrapment. This process is particularly effective where a comparatively viscous polymerizable liquid having a viscosity above 500 centipoises is used, since in such a case it is possible to maintain the sealing pool in contact with the under roll and the underside of the sheet without difficulty. In the use of liquids of lower viscosity special precautions may be required to accomplish the result.

Preferably, the cover sheets should be larger than the impregnated fibrous base and should overlap at the edges. In this case the polymerizable liquid is squeezed toward the edges of the cover sheets, coating them and causing them to adhere to each other, thereby forming a seal preventing air from entering from the side of the impregnated fibrous sheet as shown in Fig. 3. Occasionally, particularly where the polymerizable liquid is comparatively viscous and adhesive, the process is performed using cover sheets which do not overlap at the edges so that while the laminate is essentially enclosed, the edges may be somewhat exposed. This may result in a somewhat less effective seal and sometimes the edges of the resulting laminate may be defective. Such defects if formed may be trimmed off and a central portion which is free of defects obtained.

The continuous sheet thus formed may be sliced into lengths of desired size and supported in a convenient manner for curing.

In slicing these sheets air leakage often occurs at the point of severance, spoiling the seal. The problem is particularly objectionable when the cellophane cover sheet is under tension since slicing in such a case may cause slippage of the cover and thus produce wrinkles and destroy the seal. This difficulty may be avoided by applying clamping strips of metal or other rigid material the full distance across the sheet and located on both sides of the point of severance before cutting the sheet, whereby the cover sheet is held tightly against the impregnated base. If desired, similar strips may be placed at the sides of the laminate in order to prevent air leakage and/or drainage either before or after the sheet is severed into lengths. The sheet thus secured may be cured to a gel or immobile state, or to a finally cured state.

The clamps applied to the edges of the cellophane covered sheet may be used solely to prevent or minimize drainage and/or air leakage at the edges of the assemblage. In such a process no effort is made to prevent shrinkage of the cellophane during curing. Quite often however it is found advantageous to establish tension in the cellophane cover sheet or sheets or at least to use precautions to remove wrinkles in the cellophane and to prevent formation of others. This may be done simply by making use of the tendency of the shrinkage which occurs in the cellophane on heating, since restraining or minimizing shrinkage of the cellophane over a substantial area of the laminate enables attainment of improved results.

As shown in Fig. 2, sheets prepared as in Fig. 1 and sliced into suitable lengths may be placed upon a metal or glass plate or other rigid base 10 and the edges of the assemblage fastened to the base by means of flat strips 12 which are held against the cover sheet by means of clamps 14. The strips may be located above the laminate adjacent the edges thereof. Where the cellophane sheets overlap the strips may be laid upon the overlap, or partly upon the laminate and partly upon the overlap. The strips may be applied to the entire periphery of the laminate if desired. This may be unnecessary since it is in many cases found that a satisfactory result may be secured by applying clamps to a pair of opposite sides only. By thus clamping the edges of the cellophane cover sheets, movement of the opposite edges of the cover sheet toward each other is restrained or at least substantially minimized. Accordingly, shrinkage of the cellophane during curing under heat primarily results in establishment of tension therein and this tension causes the cellophane sheet to flatten out and to press more closely against the laminate, thus imparting a smoother surface to the laminate and causing closer adherence between the layers of the laminate, particularly where the curing is effected without pressure or without substantial pressure.

The process is capable of many variations and the resin impregnated products herein contemplated may be prepared in many ways. For example, the process may be performed as illustrated in Fig. 3 wherein a fibrous base 16 may be placed upon a sheet of cellophane or similar material 18 resting upon a suitable base 10 and impregnated with an excess of polymerizable liquid. Thereupon a second sheet of cellophane 20 may be laid upon the impregnated base and the assemblage compacted by rolling a roller 22 from an edge of the assemblage or a central portion thereof toward another edge. By this means entrapped air is swept from the impregnated base by the excess polymerizable liquid which is squeezed out ahead of the roller. The cellophane cover sheets are forced into intimate and closely adherent contact with the impregnated base so that after the rolling and compacting pressure is released the cellophane is held in place.

While the invention has been described with reference to the use of envelopes made from a pair of cover sheets it is not so limited. For example a cellophane sheet may be folded and the laminate placed between the folds. Moreover, three or more cover sheets which overlap may be used where the fibrous article is of substantial thickness, width and length. Cylindrical parts may be prepared by wrapping impregnated fabric in one or more layers around a collapsible cylindrical mandrel which is preferably covered with cellophane and wrapping the product with a cellophane sheet of sufficient length to overlap the fabric. The product is then rolled and excess resin and excess polymerizable liquid is squeezed between the overlap and to the edges of the cylinder. These edges may be clamped and the product cured.

Occasionally it may be desirable to apply a light weight such as a glass or a metal plate to the sheets in order to insure production of a compact laminate during curing. Weights capable of establishing very low unsubstantial pressures of about ⅛ to 15 pounds per square inch are sufficient for this purpose. Generally this pressure is substantially below that applied to squeeze out the excess polymerizable liquid as described above.

The present process permits the formation of a wide variety of fibrous parts in various shapes and contours from the product enclosed and sealed as described above. For example, if a flat sheet is desired, the laminate may be cured while holding the laminate flat. On the other hand products of arcuate cross section such as a cylinder or cylindrical segment or a product of other curvature may be prepared simply by holding the assemblage in the desired shape during curing. Thus a covered impregnated fibrous base prepared as in Fig. 3 may be laid upon a mandrel 24 having a curved top and the cellophane clamped as shown in Fig. 4 to form a curved laminate, or it may be laid upon a channel or angle iron to form a channel or angle section. The process is especially advantageous because the curing may be carried out without pressure, thereby eliminating the requirement of a pair of complementary molds, or a vacuum bag, hitherto regarded as essential, and because it permits fabrication, in a simple and economical manner, of many shaped parts using only a single mold, which may be either a male or a female mold, depending upon the type of part required. The process of my invention enables one to use special hand or machine shaping operations which are not feasible in the high pressure fabrication processes, and also enables one to produce sheets of large size and shaped parts of unusual contour or size which cannot be produced in accordance with the prior art high pressure processes.

Although the process may be advantageously carried out using two flexible cover sheets to form the nonporous envelope certain parts may be formed using other types of envelopes. For example a suitable envelope for many purposes may be formed by use of a single flexible sheet. In such a case the laminate may be laid upon a flat or curved rigid base, as an aluminum or a glass plate, and the cellophane cover sheet applied as described above to form a flexible cover.

While the invention has been described with particular reference to the use of cellophane as a cover sheet it is not limited to this material since other flexible nonrigid sheets which are essentially nonporous or impermeable to the polymerizable liquid and/or to air and which are not dissolved by the polymerizing liquid may be used. For most cases such sheets should be capable of being wetted by the polymerizable liquid and, in general, should be nonporous films or foils having a thickness below about 0.05 inch. Materials which are capable of shrinking or contracting during heating, such as cellophane or polyvinyl alcohol films are especially valuable. However other foils or films, including rubber, metal foil or similar thin sheets, etc., may be used where establishment of tension in the cover sheet during curing is found unnecessary and where the primary problem involves the prevention of drainage or inclusion of air. Such materials are normally nonadherent to the polymerizable liquid and may be removed readily after the resin impregnated sheets are cured. Cellulose acetate or nitrate sheets or foils may be suitable in some cases but very often such foils adhere too readily to the polymerizable compound and may not be readily removed from the cured product.

The process may be used to produce resinous parts from various types of fibrous materials, such as sheets of cotton or wool fabrics, canvas, duck, muslin, linen, rayon or nylon fabrics, woven or felted fiberglass, asbestos, or cotton batting, etc. The process is especially effective in producing laminated products comprising a plurality of layers of the above materials. However, individual sheets of felted or woven fibrous material may be impregnated and polymerized as herein contemplated.

The invention may be applied to the preparation of resin impregnated fibrous sheets by polymerization of various polymerizable liquids. Particularly desirable products may be prepared by the use of oxygen-convertible compounds containing at least two unsaturated, unconjugated, polymerizable groups. Thus the process may be applied to the following classes of materials.

1. Polymerizable unsaturated alcohol esters of unsaturated acids such as the esters of vinyl, allyl, methallyl, crotyl, beta ethyl allyl, propargyl, methyl propargyl, oleyl, linoleyl, ricinoleyl, phenyl propargyl or cinnamyl alcohol and unsaturated acids such as acrylic, methacrylic, alpha or beta chloracrylic, crotonic or cinnamic acids, including allyl acrylate, allyl alpha chloracrylate, etc.

2. Polymerizable unsaturated alcohol polyesters of polybasic acids such as phthalic, carbonic, oxalic, succinic, adipic, azelaic, sebacic and terephthalic acids, including diallyl carbonate, diallyl maleate, diallyl fumarate, diallyl oxalate, diallyl adipate, diallyl itaconate, diallyl succinate, ethylene glycol bis (allyl carbonate), diethylene glycol bis (allyl carbonate), and mixtures thereof.

3. Polyhydric alcohol esters of the above unsaturated acids and polyhydric alcohols such as ethylene glycol, diethylene glycol, propylene glycol, dipropylene glycol, triethylene glycol, hexaethylene glycol, glycerol, sorbitol, mannitol, erythritol, polyvinyl alcohol or cellulose esters, including ethylene glycol diacrylate, ethylene glycol dimethacrylate, etc.

4. Polyhydric alcohol polyesters of polybasic acids, including esters of the above polyhydric alcohols and maleic, fumaric, itaconic or citraconic acids. Such esters may include alkyds such as ethylene glycol maleate or fumarate or compounds such as ethylene glycol bis (methyl fumarate), ethylene glycol bis (ethylene fumarate), etc. Esters formed by reaction of polyhydric alcohol-unsaturated dibasic acid esters having an acid number below about 150 with a monohydric alcohol such as methyl, ethyl or propyl alcohol in amount sufficient to reduce the viscosity, and the monobasic acid reaction products thereof, as described in the applications of Charles Gould No. 491,657, filed June 21, 1943, now abandoned, and Serial No. 520,319, filed January 29, 1944, now Patent No. 2,418,633, are included.

5. Polymerizable ethers, including divinyl ether, etc., and copolymers of the ethers and any of the above compounds.

6. Other organic compounds containing two or more unsaturated, unconjugated groups, including divinyl benzene, divinyl naphthalene, vinyl acetylene, divinyl acetylene, etc.

In addition the process may be applied to the treatment of copolymers of the above polyfunctional materials and unsaturated compounds containing but a single unsaturated group such as vinyl acetate, methyl acrylate, acrylonitrile, methyl methacrylate, ethyl methacrylate, butyl methacrylate, styrene, vinyl chloride, vinylidine chloride, methyl itaconate, methyl fumarate, methyl alpha chloracrylate, etc.

Other liquid polymerizable or condensible materials capable of curing to a thermosetting state, including glycerol phthalate, liquid phenol aldehyde resin, melamine aldehyde condensation products, urea condensation products or mixtures of these materials in admixture with the above compounds containing two or more polymerizable groups may also be used in accordance with the present invention.

The process herein contemplated possesses special value when applied to polymerizable liquids of low or comparatively low viscosity, for example below 500 centipoises, such as monomeric or partial polymers of diallyl phthalate, diallyl carbonate, diallyl succinate, glycol dimethacrylate, allyl methacrylate, etc. Prior to the present invention it has been observed that such materials often drain from the impregnated fabric to an excessive degree and in consequence, drain marks or air spots are formed. This difficulty is eliminated by the present process. With more viscous materials (viscosity 500 centipoises or above) the problem of drainage or air leakage is less acute. However the process serves to more thoroughly compact the laminate, particularly where the operation is conducted in a manner so as to establish tension in the cover sheet.

The following examples are illustrative:

*Example 1*

Diallyl phthalate containing 5 per cent by weight of benzoyl peroxide was heated at 80 to 85° C. in a flask equipped with a stirrer and a 1 mm. glass tube provided with two spaced marks. At the beginning of the heating period and periodically thereafter the diallyl phthalate was drawn up into the tube and allowed to flow back, the time required for the liquid to flow between the two marks being observed with a stop watch. When the time increased to 15 times the initial time the syrup obtained was cooled to room temperature.

A stack of ten layers of muslin cloth was centrally laid upon a sheet of cellophane resting on a rigid base, so that the cellophane extended outwardly from the edges of the cloth. Three parts by weight of the thickened diallyl phthalate per part by weight of cloth was poured upon the cloth and distributed between the layers until the impregnation was substantially uniform. A cellophane cover sheet was laid upon the impregnated laminate so that the cellophane sheet covered the laminate and the edges of the cellophane overlapped the cloth laminate. A roller was placed in the middle of the assemblage and excess polymerizable syrup forced out to the edges of the assemblage being compacted and rolled until the resin content of the fabric was about 60 per cent by weight, based upon the weight of the impregnated cloth. Entrapped air was forced out of the laminate along with the excess polymerizable syrup forced between the overlapping edges of the cellophane and the assemblage was sealed by the excess syrup against reentry of air. Metal strips were placed upon the overlapping edges of the cellophane along each side of the sheet and the strips clamped against the rigid base as shown in Fig. 2.

The enclosed laminate was placed in an oven and cured according to the following cycle:

½ hour at 174° F.
½ hour at 180° F.
½ hour at 185° F.
½ hour at 190° F.
½ hour at 200° F.
15 minutes at 207° F.
15 minutes at 215° F.
15 minutes at 225° F.
15 minutes at 240° F.
15 minutes at 245° F.
15 minutes at 250° F.

During curing the cellophane shrunk and flattened out tightly against the laminate. After curing was completed the cellophane was removed and a well-bonded, relatively rigid, flat laminate was obtained.

Where a shaped laminate is desired, the enclosed laminate made as described in the foregoing example may be laid upon a mold having a desired contour (cylindrical segment, angle channel section, etc.) and the cellophane top sheet clamped as described. The laminate is then cured by heat as above described while the envelope and laminate are held in the bent or contoured state.

Although the present invention has been described with particular reference to the specific details of certain embodiments thereof, it is not intended that such details shall be regarded as limitations upon the scope of the invention, except in so far as included in the accompanying claims.

I claim:

1. A method which comprises impregnating a fibrous base with a polymerizable liquid comprising an oxygen-convertible compound having at least two unsaturated, unconjugated polymerizable groups, capable of curing to a rigid solid resinous state, covering the base with a sheet of a flexible, essentially nonporous material capable of shrinking upon heating, holding the sheet against the base while restraining movement of at least one pair of opposing edges thereof toward each other, and heating the assemblage and polymerizing the said liquid composition to the solid resinous state, whereby during heating shrinkage of the sheet causes it to flatten out against the impregnated base.

2. A method which comprises placing a fibrous base impregnated with a polymerizable liquid comprising an oxygen-convertible compound having at least two unsaturated, unconjugated polymerizable groups, capable of curing to a rigid solid resinous state, between a pair of sheets, at least one of which is flexible, essentially nonporous and capable of shrinking upon heating, holding the flexible sheet against the base while restraining movement of at least one pair of opposing edges thereof toward each other, and heating the assemblage and polymerizing the said liquid composition to the solid resinous state, whereby during heating shrinkage of the sheet causes it to flatten out against the impregnated base.

3. A method which comprises impregnating a fibrous base with a polymerizable liquid comprising an oxygen-convertible compound having at least two unsaturated, unconjugated polymerizable groups, capable of curing to a rigid solid resinous state, covering the base with a sheet of a flexible, essentially nonporous material capable of shrinking upon heating, holding the sheet against the base while restraining movement of at least one pair of opposing edges thereof toward each other, and heating the assemblage and polymerizing the said liquid composition to the solid resinous state without substantial pressure on the base, whereby during heating shrinkage of the sheet causes it to flatten out against the impregnated base.

4. The process of claim 3 wherein the flexible sheet is cellophane.

5. The process of claim 3 wherein the flexible sheet is a polyvinyl alcohol film.

6. A method which comprises impregnating a fibrous base with a polymerizable liquid comprising an oxygen-convertible compound having at least two unsaturated, unconjugated polymerizable groups, capable of curing to a rigid solid resinous state, covering the base with a cover of a flexible, essentially nonporous material capable of shrinking upon heating, clamping the cover against the impregnated base with sufficient force to substantially minimize slippage of the cover and heating the assemblage and polymerizing the said liquid composition to the solid resinous state, whereby during heating shrinkage of the tightly held cover causes it to flatten out against the impregnated base.

7. A method which comprises impregnating a fibrous base with a polymerizable liquid comprising an oxygen-convertible compound having at least two unsaturated, unconjugated polymerizable groups, capable of curing to a rigid solid resinous state, covering the base with a cover of a flexible, essentially nonporous material capable of shrinking upon heating, restraining movement of the cover and heating and polymerizing the said liquid composition in the fibrous base to the solid resinous state, whereby during heating shrinkage of the cover causes the cover to flatten out against the base.

8. A method which comprises establishing a fibrous sheet impregnated with a polymerizable liquid comprising an oxygen-convertible compound having at least two unsaturated, unconjugated polymerizable groups, capable of curing to a rigid solid resinous state, between a pair of walls, at least one of which is a flexible substantially nonporous sheet capable of shrinking during heating, clamping the walls together and restraining movement of a pair of opposite edges of the flexible wall toward each other, and heating and polymerizing the said liquid composition in the base until the same is converted to the solid resinous state, whereby during heating, shrinkage causes the flexible wall to flatten out against the base.

9. A method which comprises impregnating a fibrous base with a polymerizable liquid comprising an oxygen-convertible compound having at least two unsaturated, unconjugated polymerizable groups, capable of curing to a rigid solid resinous state, placing the base between a pair of sheets, at least one of which is flexible and substantially nonporous and capable of shrinking upon being heated, pressing the cover sheets into close contact with the fibrous base by application of pressure of magnitude sufficient to squeeze the base and to expel laterally of the cover sheets polymerizable liquid and entrapped air, thereby forming about the base an essentially fluid tight envelope which is open at the edges, clamping the cover sheets together adjacent the edges and polymerizing the said liquid composition in the fibrous base by heat until the same is converted to a solid resinous state.

10. The process of claim 9 wherein the cover sheets overlap the base and are superposed upon each other adjacent the edges of the base.

11. A method which comprises impregnating a fibrous base with a polymerizable liquid comprising an oxygen-convertible compound having at least two unsaturated, unconjugated polymerizable groups, capable of curing to a rigid solid resinous state, placing the base between a pair of sheets, at least one of which is flexible and substantially nonporous and is capable of shrinking upon heating, pressing the cover sheets into close contact with the fibrous base by application of pressure of magnitude sufficient to squeeze the base and to expel laterally of the cover sheets polymerizable liquid and entrapped air, thereby forming about the base an essentially fluid tight envelope, clamping the cover sheets together and restraining movement of a pair of opposed edges of said flexible cover sheet toward each other, and heating and polymerizing the said liquid composition in the base until the same is converted to a solid resinous state, whereby during heating shrinkage causes the flexible cover sheet to flatten out against the base.

12. The process of claim 7 wherein the flexible cover is cellophane.

13. The process of claim 11 wherein the flexible cover is cellophane.

IRVING E. MUSKAT.

REFERENCES CITED

The following references are of record in the file of this patent:

UNITED STATES PATENTS

| Number | Name | Date |
|---|---|---|
| 1,206,656 | Benedictus | Nov. 28, 1916 |
| 2,058,703 | Malivert | Oct. 27, 1936 |
| 2,251,270 | Czapek | Aug. 5, 1941 |
| 2,255,313 | Ellis | Sept. 9, 1941 |
| 2,311,518 | Caligari | Feb. 16, 1943 |
| 2,343,225 | Pray et al. | Feb. 29, 1944 |
| 2,379,248 | Muskat | June 26, 1945 |
| 2,397,827 | Williams | Apr. 2, 1946 |
| 2,465,093 | Swedlow | Dec. 14, 1948 |

FOREIGN PATENTS

| Number | Country | Date |
|---|---|---|
| 540,169 | Great Britain | Oct. 8, 1941 |
| 549,043 | Great Britain | Nov. 4, 1942 |

OTHER REFERENCES

Plastics Bulletin No. 2, page 5, Aug. 10, 1942, The Pittsburgh Plate Glass Co.